Dec. 17, 1935.  E. P. GAINES  2,024,853
AIRPLANE
Original Filed May 2, 1931   3 Sheets-Sheet 1
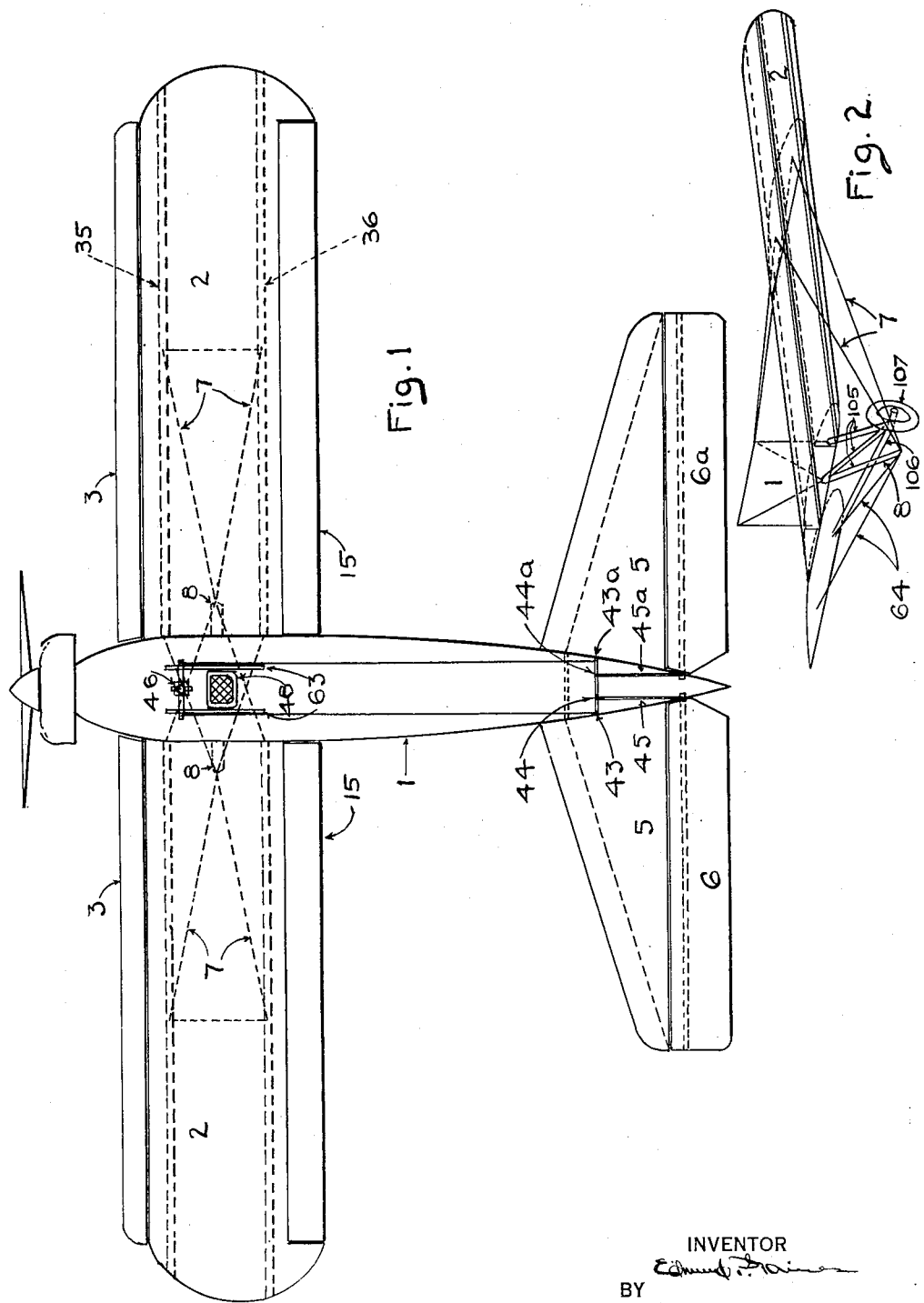
INVENTOR
Edmund P. Gaines
BY
Jerome R. Cox
ATTORNEY Dec. 17, 1935.  E. P. GAINES  2,024,853
AIRPLANE
Original Filed May 2, 1931    3 Sheets-Sheet 2
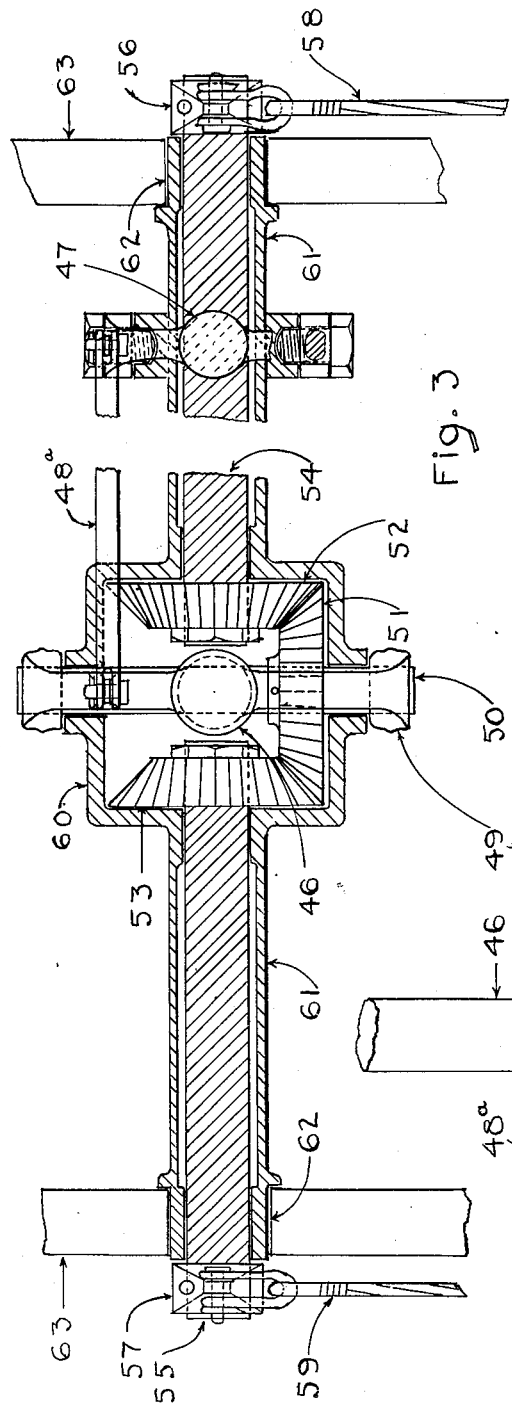
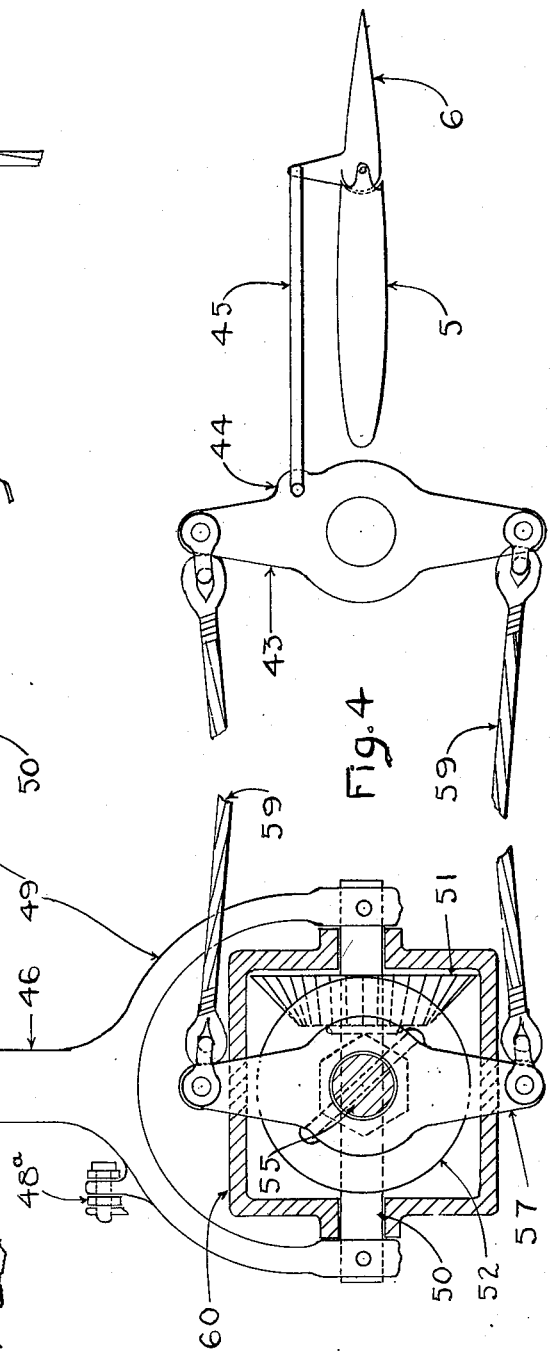
INVENTOR
Edmund P. Gaines
BY Jerome R. Cox
ATTORNEY Dec. 17, 1935.  E. P. GAINES  2,024,853
AIRPLANE
Original Filed May 2, 1931    3 Sheets-Sheet 3
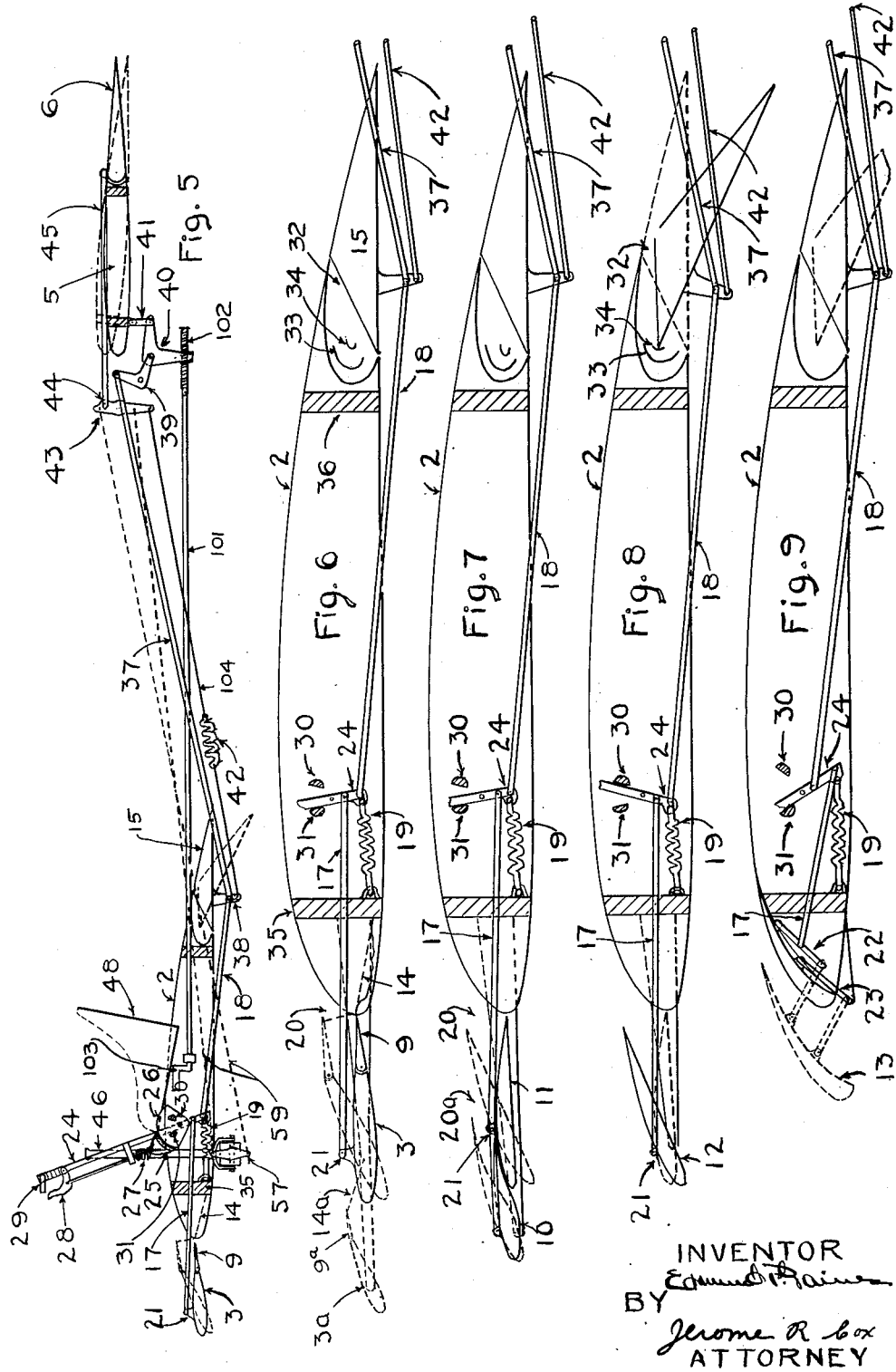
INVENTOR
Edmund P. Gaines
BY
Jerome R. Cox
ATTORNEY Patented Dec. 17, 1935

2,024,853

UNITED STATES PATENT OFFICE 2,024,853

AIRPLANE

Edmund P. Gaines, Columbia, S. C.

Application May 2, 1931, Serial No. 534,602
Renewed November 22, 1933

12 Claims. (Cl. 244—29)

This invention relates to aircraft. It is more particularly concerned with improvements to airplanes of the type which have what may be called a wide speed range. Several kinds of such airplanes have been designed intended especially for allowing the flight thereof at relatively low speeds as compared with the possible high speeds of the airplanes. On the other hand, it is well known that in conventional airplanes the low or stalling speed of the airplane generally bears a fairly definite relation to the high speed thereof. This relation is often spoken of as the speed range. My invention, therefore, is particularly concerned with the increase of the speed range of airplanes. In certain respects it comprises improvements on the airplane described in my copending Patent No. 1,881,463.

Prior to my invention there have been developed several devices for the increase of speed range. Notably among these devices are such improvements as anti-burbling slots and trailing edge flaps. It is known that when an airfoil is inclined at an angle to the air through which it is translated and which acts upon it, the lift coefficient of such airfoil increases with the increase of its angle of attack up to a certain critical angle, which past experiments indicate, varies between 12° and 20°, depending upon the airfoil. After this critical angle is passed, the value of the lift coefficient of the airfoil decreases. This decrease in value is thought to be due to the discontinuity of the air flow over the upper surfaces of the airfoil, which disturbed air flow (i. e. eddying air or vortices) is known as "burbling." When burbling begins, the air ceases to exert its full suction effect and the lift coefficient rapidly falls off. Various devices have been suggested for increasing the angle of attack at which burbling begins. Of these, the anti-burbling slots and trailing edge flaps have probably been the most successful. The slots, when combined with trailing edge flaps, have been constructed sometimes so that the slots are automatically operated, sometimes so that the slots are manually controlled, sometimes so that the automatic operation of the slots controls the flaps, and sometimes so that the slots are themselves automatically operated but the flaps are manually controlled. Where in the prior art designs, the automatic operation of the slots has been effective to control the movement of the flaps, it has usually been impossible to manually control said devices. Moreover, the forces acting on the flaps have usually been so strong as to delay the automatic operation of the slots and flaps until the airplane approached dangerously close to the stalling point. Furthermore, in such designs, there has usually been an apparently insurmountable bar to the use of flaps throughout the span of the wing in that part of the wing was necessary for ailerons. Moreover, in the devices previously designed for the purpose of increasing the speed range, there has been usually a difficulty in that the movement of the slots and flaps to slow speed condition has caused the airplane as a whole to be tail heavy. That is to say that, heretofore devices for increasing the lift of the main airfoils at slow speeds have been proposed without regard to the influence of this high lift on the remainder of the airplane. The designer has usually neglected the effect of the changing position of the slots and flaps on the airplane as a whole. Lift is directly proportional to the amount, rate, and distance air is shoved downward. At high speeds, a certain amount of air is pushed down a short distance at a high rate of speed. At low speeds, a greater quantity of air must be displaced more slowly downward a greater distance in order to create enough lift to support the weight of the airplane. This displacement of air downward at low speeds, whether accomplished by means of slots and flaps on the main airfoil or otherwise, is known as "downwash" and affects the relative angle of attack of the tail plane. At low speeds when the downwash is great, the airplane will become tail heavy unless the angle of attack of the tail plane is increased; or the camber of the tail plane is increased to give more lift at low angles of attack.

In the prior art development there have usually been provided three separate sets of controls and control surfaces for controlling the airplane about its three major axes. Thus, there has usually been provided a rudder for controlling the movement of the airplane about its vertical axis. There has been usually provided an elevator for controlling the movement of the airplane about its lateral axis and there have usually been provided a pair of flaps for controlling the movement of the airplane about its longitudinal axis. All of these surfaces naturally contribute their share of the drag and use up part of the power which might otherwise be all utilized for forcing the airplane through the air. As stated, lateral control in conventional airplanes is secured by means of flaps, known as ailerons, mounted on the trailing edge of the main wings. Depression of one aileron with the simultaneous raising of the one on the opposite side of the airplane gives a differential of lift which maintains lateral equilibrium, or produces a rolling moment, as desired. One fault of such means of lateral control is that when the main wing is at or near the burble point, the depression of an aileron aggravates the condition, and the lift decreases, instead of increasing, as desired. The raising of the opposite aileron likewise decreases the lift, so practically no rolling is produced, and the total lift is reduced just when it is most needed. Furthermore, ailerons usually occupy about one half of the total wing span, which could otherwise be occupied by rear flaps to secure greater lift. Due to the fact that the tail plane is always in the downwash of the main wing, it never burbles at any normal positive angle of attack. Therefore, ideal lateral control can be secured by increasing the span of the rear flaps on the tail plane, known as the elevators, separating the right and left flaps and oppositely actuating said flaps. To produce the proper yawing moment these oppositely actuated elevators, should be differentially actuated, i. e., one should be rotated upward through a greater angle than the opposite one is rotated downward. By utilizing the elevators for both vertical and lateral control, the control system is greatly simplified and lightened.

As stated, high lift of the main wing at low speeds has heretofore been most successfully attained by providing forward transverse through slots in combination with rear flaps. The most successful through slots are formed by movable or rotatable nose vanes, operated either manually, or automatically by the air pressure. It has heretofore been proposed to interconnect the rear flap with a movable nose vane, but not with a rotatable one. The disadvantages of the heretofore proposed interconnected movable nose vane and rear flap are; when manually controlled, they will not function when most needed, without the aid of the pilot. When the interconnected system is automatically operated by the air forces acting on the movable nose vane at high angles of attack, these forces are insufficient to depress the rear flap until too near the stalling angle. Furthermore, the design and construction of a forward vane that at high angles of attack will automatically, due alone to the air forces acting upon it, open a through slot forward of the main wing and in addition provide power for depressing a rear flap, is a tedious and expensive problem.

By having the forward vane rotated or moved by a resilient member, it is not necessary to especially design it for automatic operation at all. The resilient member may be depended upon entirely to rotate or move it to open the through slot. By interposing a resilient member in the system which will move or assist in moving the forward vane, and will depress the rear flap when the wing is at high attack, the functioning of the system is positively controlled by the adjustment of the force of the resilient member. At low angles of attack, air forces on the forward vane or vanes and on the rear flap, return them to their high speed position, overpowering the resilient member. At high angles of attack and slow speed, the resilient member overpowers the air forces. The above described arrangement alone is not wholly sufficient, but should be augmented by a manual control for setting the system in any position best suited for take-off, climb, or cruising. This control should be equipped with means for selectively rendering it inoperative. It should also be provided with a safety brake whereby the system must assume the high speed condition at high speeds, in order to prevent overloading the rear beam due to the rearward shift of the center of pressure at high speeds when the wing flap is down.

Forward rotatable vanes proposed heretofore have been either of fixed cambered or fixed symmetrical cross section. The fixed cambered section causes a large drag at low angles of attack and the fixed symmetrical section is insufficient in that it does not deflect sufficient air into the low pressure area over the main airfoil. As an improvement, a flapped, forward vane or vanes is proposed herein. As may be seen, the forward vane or vanes, the main wing, and tail plane all have rear flaps. The result is an airplane with three or more tandem, variable cambered, airfoils, all but one of which are of variable incidence.

An improved through slot just forward of the wing flap is offered which takes advantage of the reverse airflow of the boundary layer of air beneath an airfoil in flight.

The airplane depicted is of the low winged, externally braced type. The bracing beneath the main wing is also of novel and simplified type.

One of the objects of this invention is to provide an airplane capable of flying at a relatively slow speed and also capable of flying at a relatively high speed, that is, an airplane capable of flying at wide speed ranges.

A further object is to provide greater efficiency and safety throughout the speed range.

A further object of the invention is to provide, in an airplane, novel controls for balancing the airplane about its longitudinal axis without the use of conventional ailerons.

A further object of the invention is to provide a pair of separate elevators and mechanism for controlling said elevators, said mechanism being capable of moving the elevators simultaneously in the same direction and also capable of moving the elevators simultaneously in opposite directions as desired.

A further object of the invention is to provide an airplane provided with automatically operated slots and flaps, together with means for automatically operating said flaps and slots at angles safely below the stalling angle of the airplane.

A further object of the invention is to provide an airplane equipped with slots and flaps which nevertheless does not become tail heavy upon the operation of said devices.

A further object of the invention is to provide an airplane equipped with automatically operated slots and flaps and provided also with manual means for controlling said slots and flaps.

A further object of the invention is to provide a new and improved form of trailing edge slot and a new and improved form of leading edge auxiliary airfoil.

A further object of the invention is to provide a new and improved unitary means for controlling the movement of the airplane both about its lateral axis and also about its longitudinal axis.

A further object of the invention is to provide a new and improved bracing structure for an airplane.

A further object of the invention is the provision of mechanism operable automatically to open a slot adjacent to the leading edge of the wings together with mechanism for normally preventing the operation of said automatic means, said mechanism being releasable automatically upon the imposition of abnormal loads in order to prevent failure of the structure.

Further objects of the invention will be apparent from a reading of the subjoined specification and claims and from a consideration of the accompanying drawings.

In order to explain the invention more clearly, five embodiments thereof are shown in said drawings, in which:

Fig. 1 is a plan view of an airplane constructed according to my invention;

Fig. 2 is a perspective view of said airplane with the right wing, the right landing gear and the right bracing wires omitted and with the fuselage shown diagrammatically;

Fig. 3 is a plan view with parts in section and on a greatly enlarged scale of a part of the control mechanism for operating my combined elevators and ailerons, parts of the apparatus being broken away;

Fig. 4 is a view in side elevation with parts in section of part of the apparatus shown in Fig. 3 together with the horizontal stabilizer, the elevator and the connections extending therefrom forward toward the control mechanism;

Fig. 5 is a diagrammatic view in side elevation with parts in section of the airplane shown in Fig. 1;

Fig. 6 is a diagrammatic view in side elevation with parts in section somewhat similar to Fig. 5 but on an enlarged scale showing a modified form of airfoil to be used on the airplane represented in Fig. 5; and Figs. 7, 8, and 9 are views similar to Fig. 6 of airfoils equipped with modified forms of leading edge slot-forming devices.

Generally, the airplane used for illustration of my invention comprises a low wing monoplane equipped with a landing gear, and a pair of separate downwardly extending cabane struts, both entirely separate from the landing gear, the monoplane being equipped with landing wires and flying wires for supporting and bracing said wings. The airfoils used for supporting said airplane are formed with leading edge slot-producing devices and with trailing edge flaps. The trailing edge flaps are so mounted and arranged, that movement thereof downward forms, adjacent to said flaps and in advance thereof, a trailing edge slot of new and improved design. Connections are provided between the leading edge slot-producing mechanism and the trailing edge flap so that movement of the leading edge slot mechanism to open the slot causes a simultaneous downward movement of the trailing edge flap. The air forces acting on the leading edge slot-producing mechanism are not solely relied upon to move said slot and flap but auxiliary spring devices are provided to aid in this movement and insure that the slot opens and the flap moves at an angle safely below that at which the airfoil would otherwise stall. A lever is provided by which the slot may be manually opened or closed and the flap may be raised or lowered regardless of the angle of attack of the airfoil. Means are provided by which the lever may be held in any desired position and consequently the slot-forming mechanism and the flap may be held in any desired position. However, this holding means may be intentionally released, whereupon the slot-forming devices and flaps become automatic in their operation. Moreover, even though the holding means is not intentionally released, yet upon the imposition of excessive strains, the device will operate automatically to relieve the strains.

The whole span of the wing is available for flaps as well as for slots. I control the movement of the airplane about its longitudinal axis as well as about its lateral axis by means of a pair of elevators which may be operated simultaneously in one direction or simultaneously in opposite directions or in any combination thereof. The ordinary control stick is provided and through a system of beveled gears, shafts and cables is capable of moving both elevators up and down responsive to forward and rearward movement of the lever, and moving both elevators oppositely, one up and one down in response to lateral movement of the lever.

Referring particularly to the drawings, I have shown therein an airplane equipped with a fuselage 1 and main airfoils or wings 2—2. Each of the wings includes a front spar 35 and a rear spar 36. Each of the wings is provided with an auxiliary airfoil 3 mounted in advance of the leading edge thereof and adapted at times to be moved to form a through slot for the prevention of burbling and for increasing the ability of the airplane to fly at a relatively low rate of speed without stalling. Each of the wings is also equipped with a trailing edge flap designated 15 and provided for the purpose of increasing the lift of the airfoil especially at low rates of speed. It is to be especially noted that no conventional ailerons are provided. At the rear end of the fuselage there is attached on each side a pair of horizontal stabilizers, 5—5, manually adjustable to vary the trim of the airplane and also automatically adjustable in response to movement of the slot-forming airfoils 3 and the flaps 15.

As shown most clearly in Fig. 5 the auxiliary airfoil 3 is equipped with a flap 9 pivotally mounted on the auxiliary airfoil 3 at the rear end thereof. In the high speed condition shown in full lines in Fig. 5 the airfoil 3 and the flap 9 are aligned with the main airfoil 2 and add very little to the drag of the main airfoil. However, in the low speed condition shown in dotted lines in Fig. 5 the flap 9 pivots on the airfoil 3 to form both together a cambered airfoil and thus to form a slot of correct Venturi shape adjacent to the leading edge of the main airfoil 2 so that the characteristics of the airfoil at angles beyond the normal stalling angle thereof are very much improved and the lift of the airfoil at said angles is increased. This enables the airplane to fly at angles of attack beyond the normal stalling angle and at slower speeds. A cable 14 is attached to the rear end of the flap 9 and is secured to the leading spar 35 of the airplane so that the correct camber of the combined airfoil 3 and the flap 9 is automatically formed as the airfoil and flap move toward the position shown in dotted lines.

As stated above, the auxiliary airfoil 3 is connected with operating means and also with the trailing edge flap for the main airfoil. The airfoil 3 has formed therewith an upstanding lug 21 to which is pivotally connected a link 17 extending rearward and connected to the lever 24. The lever 24 carries a brake shoe 25 adapted to contact with a braking surface 26. The latter is formed as a segment of a circle with the center of the circle coinciding with the pivot for the lever. The braking shoe 25 is adapted to contact normally with the braking surface 26 but is mounted upon the lever 24 and controlled by a spring-pressed link 27 connected at its upper end to a release handle 28 which is adapted at times to be held by a latch 29. It may thus be seen that movement of the lever 24 may be operative to move the airfoil 3 and the flap 9 from the high speed position shown in full lines in Fig. 5 to the high lift position shown in dotted lines in the same figure, in which last named position the through slot 20 is formed. Or the lever 24 may move the airfoil 3 and the flap 9 to any intermediate position. Stops 30 and 31 are provided for limiting the movement of the lever 24 and for thus limiting the movement of the auxiliary airfoil 3, the flap 9, and, as will later be seen, also the trailing edge flap 15. The braking shoe 25 pressing against the braking surface 26 is normally adapted to hold the airfoils releasably in any desired position. The pilot may, however, by the compression of the handle 28 release the brake shoe from the braking surface and move the lever to any other position desired. He may by placing the latch 29 around the handle 28 release the brake shoe entirely and allow the auxiliary airfoils to move substantially freely and automatically under the influence of air pressures and a spring later to be described. Also pivotally secured to the lower end of the lever 24 is a link 18 which extends rearwardly to a horn 38 secured on the under surface of the flap 15. Also pivotally secured to the lower end of the lever 24 and also below the pivot for said lever is a spring 19 which has its forward end attached to the front spar 35. It may thus be seen that movement of the leading auxiliary airfoil, whether under the influence of air pressures aided by spring 19 or whether manually operated by the lever 24, causes a simultaneous movement of the trailing edge flap 15 and that the movement of the auxiliary airfoil and the trailing edge flap to the positions shown in dotted lines is aided by the spring 19 so that said devices move to their high lift positions well before there is any possibility of the airfoil stalling. When the latch 29 is around the handle 28, releasing the brake shoe and when the airplane is flying with the main airfoil at low angle of attack, the air pressures hold the auxiliary airfoil and flaps in the high speed condition, but when flying at high angles of attack, the air pressures together with the spring 19 move said airfoil and flaps to the low speed condition. In case the release handle 28 is not held under the latch 29, if the lever 24 is in a position rearwardly of fully advanced, and the airplane attains such speed as to imperil rear wing beam 36 due to the rearward shift of the center of pressure, the brake shoe 25 will slip on brake quadrant allowing rear flap 15 and the forward airfoil 3 and the flap 9 to assume the high speed position.

I desire when the flap 15 is down (in the high lift position similar to the position of the flap shown in Fig. 8) that a slot shall be provided just forward of the nose of the flap in order that the greatest lift may be obtained from the combined airfoil and flap. However, when the flap is up (in the high speed position shown in Fig. 7) I desire that the slot shall be closed in order that the minimum drag may be imposed upon the combined airfoil and flap. To accomplish these functions I so shape the nose of the trailing edge flap 15 and the rearward extension of the main airfoil 2 and so position the pivot of the trailing edge flap 15 that when the flap is in the up position the rear edge of the main airfoil and the leading edge of the trailing edge flap shall contact at both top and bottom and completely close the slot. The rearward extension of the airfoil 2 is shaped in concave form so that when the flap 15 is in the down position a reverse through slot 32 is formed. It is known that adjacent to the trailing edge of the wing, eddies and reverse air currents are formed from the passage of the airfoil through the air. By the form of my improved slot, these reverse air currents from the boundary layer beneath the wing may pass upward and rearward through the reverse slot to the upper surface of the wing 2 and eliminate part of the turbulence. To assist the air to flow without turbulence around the nose of the flap 15 I provide curved partitions 33 and 34 in the through slot 32. It is to be especially noted that the trailing edge slot is not of the usual shape but is curved forward and upward and thereafter rearward and upward.

I provide means whereby movement of the leading edge auxiliary airfoil and the trailing edge flap to their high lift positions causes movement of the horizontal stabilizer to a position to counteract the tail heavy condition otherwise caused by the downwash occasioned by the action of said high lift devices. Pivotally connected to the horn 38 adjacent to the point at which the link 18 is connected thereto is a link 37 which extends rearwardly to a bell crank lever 39 pivoted on a stationary part of the airplane. The opposite arm of the bell crank lever 39 carries another bell crank lever 40 which has one arm connected to a link 41 having its opposite end connected to the horizontal stabilizer 5 at a point adjacent to the leading edge thereof. Inasmuch as the horizontal stabilizer 5 is pivoted adjacent to its trailing edge, movement of the leading edge auxiliary airfoil and trailing edge flap, however caused, will cause a movement of the link 37, the bell crank lever 39, the bell crank lever 40 and a consequent increase or decrease in the angle of incidence of the horizontal stabilizer 5. Means are also provided (as will be later described) to increase simultaneously the camber of the combined airfoil formed by the stabilizer 5 and the elevators 6. A shaft 101 provided with a worm screw 102 at its rearward end is threaded into the lower end of the bell crank 40. The shaft 101 has a crank 103 at its leading end adjacent to the seat 48 for the pilot which serves to adjust manually the horizontal stabilizer, as desired. It may be seen that rotation of the crank 103 causes the worm screw 102 to rotate within the lower end of the bell crank 40 and inasmuch as the shaft 101 is fixed against longitudinal translation, the bell crank 40 is rotated on its pivot and movement of the opposite end thereof causes the raising or lowering of the front end of the stabilizer 5.

Means are provided to utilize the elevators 6 and 6ª both for the purpose of control about the lateral axis of the airplane (pitching) and also for control about the longitudinal axis thereof (rolling). Referring particularly to Figs. 3 and 4 it may be seen that the control stick 46 is fixedly secured to a stub shaft 50 through a yoke 49 which is fastened to opposite ends of the stub shaft 50. Said shaft 50 extends longitudinally of the airplane and is mounted for rotation about an axis extending longitudinally of the airplane. Secured or keyed to the stub shaft 50 is a bevel gear 51 mounted within the casing or gear box 60. The stub shaft 50 passes through complementary openings in the casing 60 so that movement of the control stick fore and aft causes a corresponding rocking of the casing 60. The casing 60 is in effect integral with shaft housing 61 which is mounted to rotate in bearings 62—62 formed in the supports 63. Also carried in the casing 60 and meshing with the bevel gear 51 are a pair of bevel gears 52 and 53 mounted on shafts 54 and 55 for rotation therewith. Secured to opposite ends of the shafts 54 and 55 are levers 56 and 57. The upper and lower ends of the lever 57 are connected to a pair of cables 59 extending rearwardly to the upper and lower ends, respectively, of a lever 43 mounted adjacent to the horizontal stabilizer. The upper and lower ends, respectively, of the lever 56 are secured to a pair of cables 58 which extend rearwardly and are connected to a lever 43ᵃ similar to the lever 43 which is also mounted adjacent to the horizontal stabilizer. The levers 43 and 43ᵃ are provided with a pair of lugs 44 and 44ᵃ, respectively, to which are connected links 45 and 45ᵃ extending rearward to horns secured on the upper sides of elevators 6 and 6ᵃ, respectively. The lugs 44 and 44ᵃ are positioned above the axis or center of rotation of the levers 43 and 43ᵃ and rearward from the vertical projection of said axis. By the location of lugs pivotally connected to the links in this position a differential operation of the elevators 6 and 6ᵃ is accomplished in a well known manner in that movement of the levers 43 and 43ᵃ to raise one of the elevators 6 or 6ᵃ and to lower the other causes a relatively greater movement of the elevator raised than the movement of the elevator lowered. It may be seen that movement of the control stick 46 laterally (or in other words about an axis extending longitudinally of the airplane) causes a rotation of the beveled gear 51 about its axis and rotation of the beveled gear 53 in one direction and rotation of beveled gear 52 in the opposite direction thus causing opposite movements of the levers 56 and 57, the levers 43ᵃ and 43, and a raising of one of the elevators 6 and 6ᵃ and the lowering of the other. On the other hand, a movement of the control stick 46 fore and aft of the airplane causes a like movement of rotation of casing 60 and shaft housing 61. This also causes a simultaneous similar rotation of the beveled gears 52 and 53 as if integral with the beveled gear 51 and the casing 60. This causes a like rotation of the levers 56 and 57, the levers 43ᵃ and 43 and the elevators 6ᵃ and 6 all in the same direction. It is to be understood that while a control stick is shown, a wheel control may be substituted therefor if desired.

If desired, a dual control may be provided in the airplane. For this purpose a stick 47 may be mounted on a collar secured to the sleeve 61 so that the rotation of the stick 47 fore and aft causes a rotation of the sleeve 61 and with it a rotation of the casing 60, the shaft 50 and the stick 46 about the lateral axis of the shafts 54 and 55. A projection on stick 47 is pivotally connected to a link 48ᵃ. The link 48ᵃ is also pivotally connected to an upstanding lever mounted on the stub shaft 50 so that movement of the stick 47 laterally of the airplane causes a corresponding movement of the stick 46. Thus, whether the stick 47 is moved fore and aft or laterally, the stick 46 moves similarly and causes the desired movement of the control surfaces.

As suggested above, I provide means whereby movement of the auxiliary airfoil 3 and the flap 9 and simultaneous movement of the trailing edge flap 15 to create a high lift condition for the main lifting surfaces, causes a tendency on the part of the elevators 6 and 6ᵃ to move to a position in which they form with the horizontal stabilizer 5, a cambered airfoil of considerably greater lifting qualities than the symmetrical airfoil formed by the normal combination of the two parts. The horn 38 (Fig. 5) is connected to the lower end of the lever 43 by means of a cable 104 in which is interposed a spring 42 so that when the auxiliary airfoil 3, the flap 9 and the flap 15 are moved to their high lift condition, at the same time that the angle of incidence of the horizontal stabilizer is increased as a result of said movement, the elevators 6 and 6ᵃ are resiliently moved downward relative to the horizontal stabilizer 5 to form together with said stabilizer a cambered airfoil.

In Fig. 6 I have shown a method for creating a plurality of slots adjacent to the leading edge of the main airfoil. As shown in Fig. 6 there is provided a leading edge auxiliary airfoil 3, a flap 9 therefor in all respects the same as the auxiliary airfoil and flap shown in Fig. 5. Mounted in advance of said auxiliary airfoil 3 and flap 9 are a smaller airfoil 3ᵃ and a smaller flap 9ᵃ. These act exactly the same as the airfoil 3 and the flap 9 and the trailing edge of the flap 9ᵃ is restrained by a cable 14ᵃ similar to the cable 14.

In Fig. 7 I have shown a pair of pivoted airfoils 11 and 10 of non-symmetrical lifting section which are adapted by reason of their contour to fit against each other and form a single airfoil when positioned in the high speed condition. Thereby, the slots 20 and 20ᵃ are formed when the airfoils pivot about their axes.

In Fig. 8 I have shown a single airfoil 12 of non-symmetrical lifting section which is mounted and controlled in all respects similarly to the airfoil 3 shown in Fig. 5.

In Fig. 9 I have shown an airfoil 13 pivotally mounted on links 22 and 23 adjacent to the leading edge of the main airfoil 2 and adapted to move on said links 22 and 23 from the position shown in full lines in which they form a part of the leading edge of the main airfoil to the position shown in dotted lines in which a through slot is formed.

Fig. 2 illustrates my improved bracing for the low wing monoplane illustrated and described. Inasmuch as both wings are braced exactly alike, it is believed that it is necessary to show and describe the bracing for only one wing—the left one. As may be seen, the left landing gear struts 105 together with the left axle 106 carry the left landing wheel 107. An entirely separate strut 8 extends downward and outward from the junction of the left wing 2 with the fuselage 1 and is connected by a pair of diverging brace wires 64 with the junction of the opposite (or right) wing and the fuselage. The lower end of the strut 8 is connected by a pair of diverging bracing wires 7 with the left wing 2 at fore and aft spaced points intermediate the outer and inner ends of said wing. Each wire 7 is preferably continuous with one of its wires 84 thus passing under the lower end of the strut 8. A similar structure is provided for bracing the right wing.

It is thought that the operation of my improved airplane will be clear from the above description. When the airplane is flying in its high speed condition the airfoil 3 and the flap 9 and the flap 15 are in the position shown in full lines in Fig. 5. However, should the pilot desire to fly at a higher angle of attack and at a slower speed, he will pull back on the control stick 46, thus causing the elevator 6 to be lowered and the airplane to assume a greater angle of attack. By pulling back on the stick 46 he rotates the stub shaft 50, the bevel gear 51, the casing 60, the bevel gears 52 and 53, the shafts 54 and 55 and the sleeve 61 as a unit and thus causes a turning of the levers 43 and 43ᵃ and a lowering of the elevators 6 and 6ᵃ. If the latch 29 is around the handle 28 the lever 24 will be automatically moved together with the auxiliary airfoil 3, the flap 9, the flap 15, the horizontal stabilizer 5. If the latch 29 is not around the handle 28, the pilot at the same time as he moves the stick 46 also may compress the handle 28, thus releasing the brake shoe 25 from the braking surface 26 and may pull back on the lever 24. This action causes the airfoil 3, the flap 9, the flap 15 and the horizontal stabilizer 5, to assume the positions shown in dotted lines, at the same time causing the spring 42 to be put under tension and create a tendency to make the airfoil composed of the stabilizer 5 and the elevator 6 become a cambered lifting surface. It is thus seen that the airplane flying at a high angle of attack is equipped with an airfoil having a leading edge slot and a trailing edge slot and with a cambered lifting horizontal tail surface. This prevents the airplane from being tail heavy at the same time providing additional lift at high angles of attack.

The general aircraft structure and the stabilizing control mechanism is also shown and described and is claimed in my copending application Serial Number 715,738.

It is to be understood that the above described embodiments of the invention are for the purpose of illustration only and various changes may be made therein without departing from the spirit and scope of the invention.

I claim as my invention:

1. In aircraft, a main airfoil, an auxiliary airfoil mounted adjacent to the leading edge of said main airfoil, and resilient means connected to said auxiliary airfoil for tending to move said auxiliary airfoil to a position in which a slot is open adjacent to the leading edge of said main airfoil.

2. In aircraft, a main airfoil, an auxiliary airfoil mounted adjacent to the leading edge of said main airfoil, a trailing edge flap pivotally mounted adjacent to the rear of said main airfoil, and resilient means connected to said auxiliary airfoil and to said flap for tending to move the former to a position in which a slot is open adjacent to the leading edge and to move the latter downward.

3. In aircraft, a main airfoil, an auxiliary airfoil mounted adjacent to said main airfoil, a rear flap pivotally mounted adjacent to the trailing edge of said main airfoil, means connecting said auxiliary airfoil and said flap, a manual control for said auxiliary airfoil and flap, means for releasably maintaining said auxiliary airfoil and said flap in any desired position comprising a safety braking device, and means for rendering said safety braking device ineffective.

4. In aircraft, a main airfoil, a pivoted auxiliary airfoil mounted adjacent thereto, a lever mounted in said airplane, means connecting said auxiliary airfoil and said lever, a brake shoe mounted on said lever, a brake quadrant against which said brake shoe is adapted at times to bear, resilient means for urging said brake shoe against said brake quadrant, and means for making said resilient means ineffective.

5. In aircraft, a body, a main airfoil attached to said body, an auxiliary airfoil mounted adjacent to the leading edge of said main airfoil and movable to open and close a leading edge slot, a horizontal control surface associated with said body adjacent to the rear end thereof, and means responsive to movement of said auxiliary airfoil for simultaneously affecting the lift of said control surface.

6. In aircraft, a body, a main airfoil attached to said body, a pivoted flap attached to the trailing edge of said main airfoil, a horizontal control surface associated with said body adjacent to the rear end thereof, and means responsive to movement of said flap for simultaneously affecting the lift of said horizontal control surface.

7. In aircraft, a body, a main airfoil for said body, a horizontal control surface associated with said body adjacent to the rear end thereof, means for varying the lift of said main airfoil for any predetermined angle of incidence, and means responsive to said variations for changing the angle of incidence of said horizontal control surface.

8. In aircraft, a body, a main airfoil for said body, a horizontal control surface associated with said body adjacent to the rear end thereof, means for varying the lift of said main airfoil, and means responsive to said variations for changing the camber of said horizontal control surface.

9. In aircraft, a main airfoil, a pivoted rotatable vane mounted adjacent to the leading edge of said main airfoil, and means operable by the pilot for varying the camber of said vane.

10. In aircraft, a main airfoil, an auxiliary airfoil mounted thereon, and means for moving the auxiliary airfoil to form a slot which extends through the combined airfoil, the slot entering the combined airfoil through an opening at the bottom extending thence forward and up and thence rearward and up to an opening at the upper side of the combined airfoil, the airfoil being provided with means preventing communication to said slot except through said bottom opening and said upper opening.

11. In an aerial vehicle, a sustaining wing, a smaller wing of streamline cross section, means for mounting said smaller wing pivotally adjacent to the forward edge of said sustaining wing, a wing flap, means for pivotally mounting said wing flap adjacent to the rearward edge of said sustaining wing, a connection between said flap and said pivotally mounted smaller wing and means for manually controlling said flap and said smaller wing.

12. In aircraft, a main airfoil, a plurality of auxiliary airfoils mounted adjacent to the leading edge of said main airfoil, and means for varying the cambers of said auxiliary airfoils.

EDMUND P. GAINES.